(12) United States Patent
Smit et al.

(10) Patent No.: US 6,522,981 B2
(45) Date of Patent: *Feb. 18, 2003

(54) PROGRAMMABLE POWER SUPPLY AND BROWNOUT DETECTOR METHOD FOR A MICROPROCESSOR POWER SUPPLY

(75) Inventors: Willem Smit, Chandler, AZ (US); Theodor Johannes Dippenaar, Chandler, AZ (US); Pieter Schieke, Phoenix, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/977,652

(22) Filed: Oct. 15, 2001

(65) Prior Publication Data

US 2002/0013669 A1 Jan. 31, 2002

Related U.S. Application Data

(63) Continuation of application No. 09/154,016, filed on Sep. 16, 1998, now Pat. No. 6,304,823.

(51) Int. Cl.[7] .......................... G01R 21/00; G01R 21/06
(52) U.S. Cl. ....................................................... 702/60
(58) Field of Search ........................ 702/60, 182, 183; 714/23, 24, 25; 323/304, 318

(56) References Cited

U.S. PATENT DOCUMENTS

| 4,567,539 | A | * | 1/1986 | Sinberg | 361/92 |
|---|---|---|---|---|---|
| 4,713,553 | A | * | 12/1987 | Townsend et al. | 307/64 |
| 5,363,288 | A | * | 11/1994 | Castell et al. | 363/21.12 |
| 5,606,511 | A | * | 2/1997 | Yach | 702/64 |
| 5,737,616 | A | | 4/1998 | Watanabe | 713/340 |
| 5,781,448 | A | * | 7/1998 | Nakamura et al. | 700/293 |
| 5,825,674 | A | | 10/1998 | Jackson | 713/321 |
| 5,828,822 | A | | 10/1998 | Ernst | 714/23 |
| 5,852,737 | A | | 12/1998 | Bikowsky | 713/323 |
| 5,943,635 | A | | 8/1999 | Inn | 702/60 |
| 6,009,022 | A | * | 12/1999 | Lee et al. | 365/189.09 |
| 6,107,985 | A | * | 8/2000 | Walukas et al. | 345/102 |
| 6,177,785 | B1 | * | 1/2001 | Lee | 323/281 |
| 6,097,628 | A1 | * | 8/2001 | Rolandi | 365/185.05 |

* cited by examiner

*Primary Examiner*—John S. Hilten
*Assistant Examiner*—Demetrius Pretlow
(74) *Attorney, Agent, or Firm*—Baker Botts L.L.P.

(57) ABSTRACT

A method for a microprocessor power supply system, which features a programmable power supply and a programmable brownout detector with a central control unit that allows for independent, but coordinated, control of operating voltage and brownout reference voltage. The invention prevents improper programming of the operating voltage and the brownout reference voltage levels. The programmable power supply and brownout detector threshold can also be controlled to provide an optimum threshold over a range of operating voltages.

19 Claims, 2 Drawing Sheets

PROGRAMMABLE POWER SUPPLY AND BROWNOUT DETECTOR METHOD FOR A MICROPROCESSOR POWER SUPPLY

RELATED PATENT APPLICATION

This application is a continuation of commonly owned application Ser. No. 09/154,016 filed Sep. 16, 1998 U.S. Pat. No. 6,304,823 B1, issued Oct. 16, 2001.

BACKGROUND OF THE INVENTION

1. Field of the Invention

This invention relates generally to microprocessor and microcontroller power supplies, and more specifically, to a power supply system having a programmable power supply and a programmable brownout detector which can be set to track the power supply output. The programmable power supply and the programmable brownout detector are independently controlled by a common, intelligent control unit. The control unit may also disable the programmable brownout detector.

2. Description of the Prior Art

Programmable power supplies and brownout detectors for microprocessors are known in the art. The use of microprocessors in battery powered equipment and in high reliability applications has produced the need to change operating voltages to reduce current consumption for low power and battery powered applications and to detect when the operating voltage drops below a predetermined level for reliability considerations.

A brownout is considered to have occurred when the incoming voltage available to the microprocessor has dropped to a level where the microprocessor should not continue operating, since errors or partly functional conditions may occur in the logic or storage elements. The brownout ends when the voltage has risen back above the brownout level. A hysteresis or latching scheme can be used to prevent oscillation at the brownout level.

A brownout detector detects when the operating voltage has dropped to just above the brownout voltage level and produces a signal to indicate to the microprocessor that a brownout is pending.

The brownout detector can reset or freeze the operation of the microprocessor to avoid improper operation. In a practical application, the microprocessor must be protected against brownout conditions that can cause the logic to enter unknown states and thereby corrupt the operation of the processor.

In the existing state of the art, these power supplies and brownout detectors are either not linked in operation at all, or are linked only by virtue of the reference voltage' to the brownout detector being related directly to the operating voltage to the processor. Also there is no provision for lowering the operating voltage of a microprocessor during sleep mode to reduce current consumption.

The present invention improves upon these past techniques by providing a programmable power supply which can lower the operating voltage during sleep mode or as the application otherwise requires and a programmable burnout detector which can intelligently relate the operating voltage to a brownout level. This prevents improper operation due to the brownout level being set too high by an improper instruction or by firmware error. It also allows for a complex relationship between the operating voltage reference and the brownout detector threshold.

SUMMARY OF THE INVENTION

It is an object of the present invention to provide a programmable brownout detector and a programmable power supply for increasing the reliability of a microprocessor system.

It is an object of the present invention to provide a programmable brownout detector which cannot be misprogrammed to detect an incorrect brownout level for a given operating voltage.

It is another object of the present invention to provide a system which allows a programmable brownout detector to have a threshold optimally determined over a range of operating voltages which are programmable.

It is another object of the present invention to provide a system which reduces the operating voltage to a microprocessor during sleep mode to reduce power consumption.

In accordance with one embodiment of the present invention, a programmable power supply and a programmable brownout detector are provided. The power supply and the brownout detector are programmed by a control unit, which allows the brownout voltage and operating voltage to be varied independently.

In accordance with another embodiment of the present invention, a programmable power supply and a programmable brownout detector are provided where they are both programmed by a control unit and the control unit prevents improper programming by firmware or operating failures.

In accordance with another embodiment of the present invention, a programmable power supply and a programmable brownout detector are provided wherein they are programmed by a control unit and the control unit relates the operating voltage to the brownout level so as to optimize operation of the brownout detector.

In accordance with another embodiment of the present invention, a programmable power supply is provided wherein the operating voltage is lowered during sleep mode to reduce power consumption in sleep mode.

The foregoing and other objects, features, and advantages of the invention will be apparent from the following, more particular, description of the preferred embodiment of the invention, as illustrated in the accompanying drawings.

DETAILED DESCRIPTION OF THE PREFERRED EMBODIMENT

Figure 1:
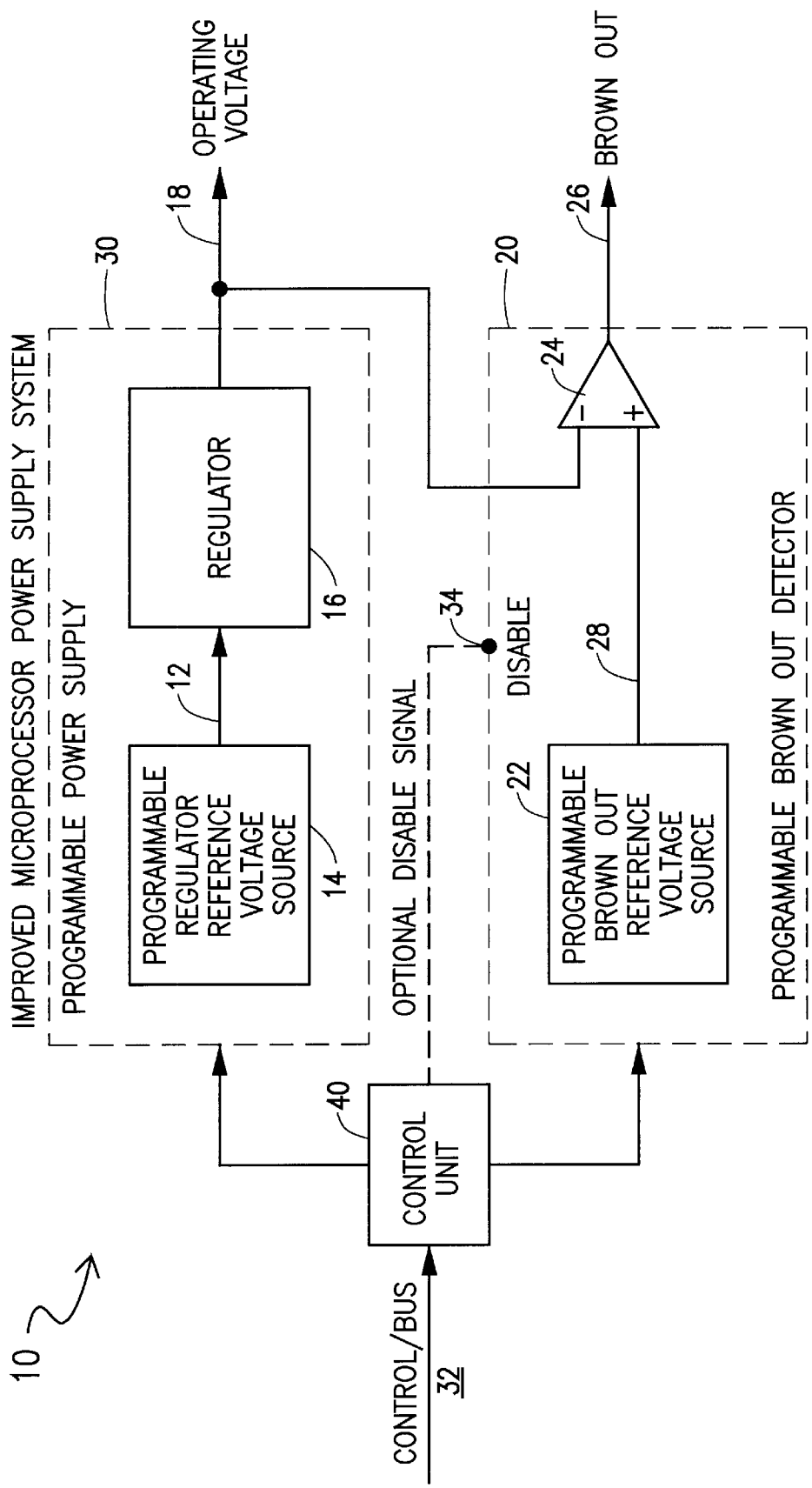
FIG. 1 is a simplified electrical diagram of the programmable power supply and programmable brownout detector.

Referring to FIG. 1, a microprocessor power supply system 10 comprising a programmable power supply 30, a programmable brownout detector 20 and a control unit 40 is implemented. The programmable power supply 30, comprises a programmable regulator reference voltage source 14 and a regulator 16.

Figure 2:
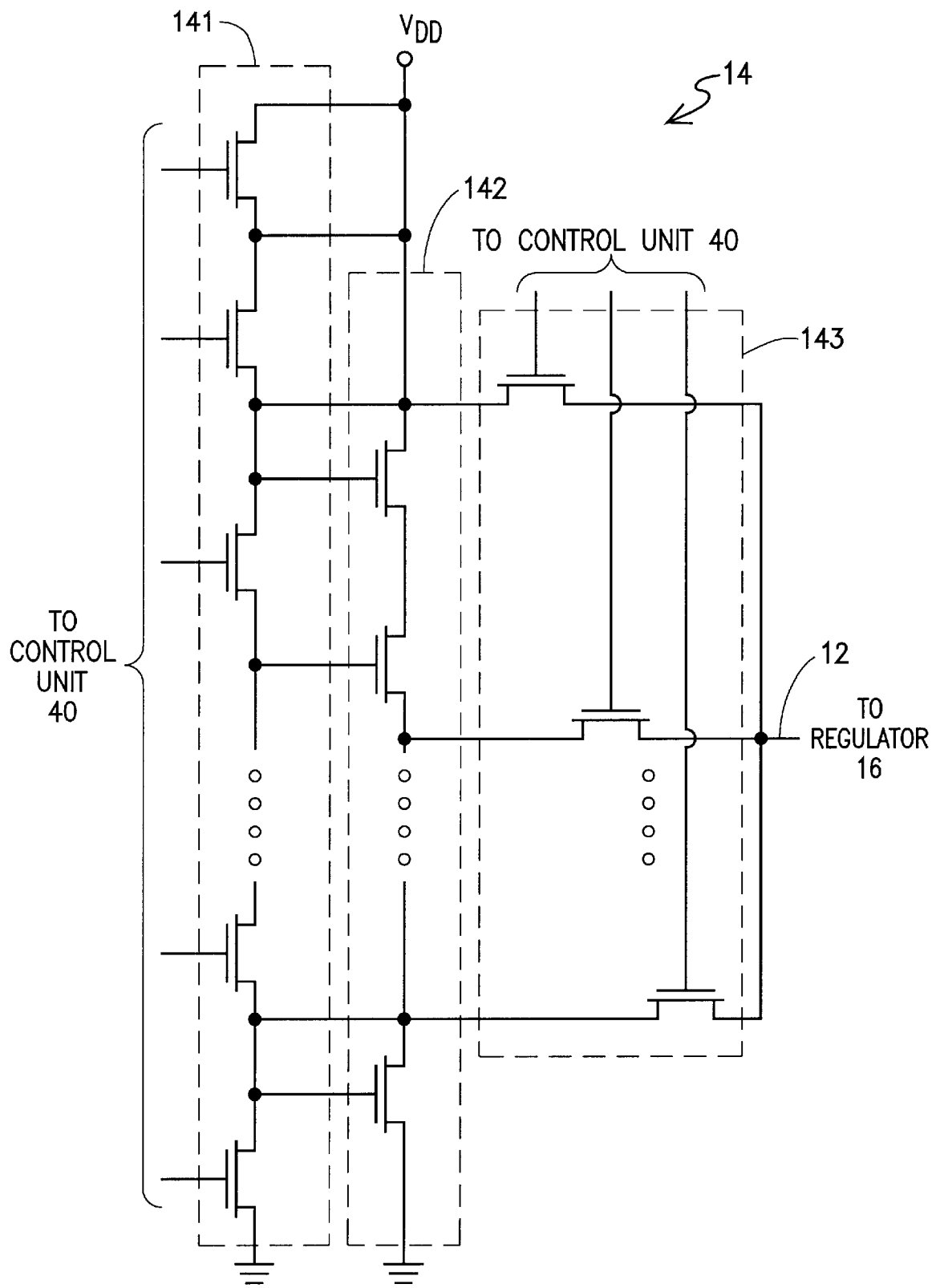
FIG. 2 is a schematic diagram of a programmable voltage divider network.

As shown in FIG. 2, wherein like numerals reflect like elements, the programmable regulator reference voltage source 14 can be implemented as a chain of linear or non-linear resistors or resistive devices 142 and are shown as MOS transistors. These resistive devices 142 may be either shunted or selected by a chain of analog switches 141. The desired voltage division may be selected by a second chain of analog switches 143 to provide a regulator reference voltage 12 selected from a variety of options. The control unit 40 would select a discrete regulator reference voltage 12 by controlling the selection of switches 141 and 143. The programmable regulator reference voltage source 14 thus is a programmable voltage divider chain or network.

Referring to FIG. 1, the regulator 16 acts as a buffer for the regulator reference voltage 12 to provide the current levels needed at the operating voltage output 18. This operating voltage output 18 provides the operating power for the microprocessor or microcontroller.

The programmable brownout detector 20, comprises a programmable brownout reference voltage source 22 and a comparator 24. The comparator 24, compares the brownout reference voltage 28, provided by the programmable brownout reference voltage source 22, to the operating voltage output 18. When the operating voltage output 18 voltage drops below the brownout reference voltage 28, a brownout condition has occurred. The brownout signal output 26 is activated to indicate to the microprocessor that the microprocessor should take action to prevent invalid operation as a result of operating voltage decay. The programmable brownout reference voltage source 22 can be implemented similar to the programmable voltage divider as described in FIG. 2 for the programmable regulator reference voltage source 14. In general, the brownout reference voltage 28 should be a fraction of the operating voltage output 18.

The control unit 40 provides the digital interface from the control bus 32 to the programmable regulator reference voltage source 14 and the programmable brownout reference voltage source 22. The control unit 40 contains logic to prevent setting invalid combinations as between the operating voltage output 18 and the brownout reference voltage 28, e.g. brownout reference voltage 28 greater than the operating voltage output 18. Thus, the control unit 40 prevents invalid voltage settings due to improper operation of the electronics or invalid programming instructions by coordinating operating voltage 18 with brownout reference voltage 28. Furthermore, the control unit 40 may provide an optional disable signal 34 which will disable the programmable brownout detector 20 from operation. The optional disable signal 34 may also be programmable.

The control unit 40 supplies the control input to the programmable brownout reference voltage source 22. The control unit 40 also contains logic to ensure that the brownout reference voltage 23 does not exceed the level of the operating voltage output 18. Those skilled in the art will recognize that these types of control functions can be implemented by a state machine or other types of combinational and sequential digital logic. Thus, the function of the control unit 40 can be extended to control the range of the brownout reference voltage 28 in any fashion necessary to protect the microprocessor from invalid operating voltages.

In one embodiment, using analog switches for the programmable brownout reference voltage source 22 and the programmable regulator reference voltage source 14, the control unit 40 can set the state of the analog switches in the programmable brownout reference voltage source 22 based on the state of the switches in the programmable regulator reference voltage source 14. For example, the control unit 40 can close the analog switches in the programmable brownout reference voltage source 22 if a corresponding switch in the programmable regulator reference voltage source 14 is closed, ensuring the brownout reference voltage 28 will never exceed the regulator reference voltage 12.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for controlling a microprocessor power supply, said method comprising the steps of:

providing a programmable power supply for supplying an operating voltage to a microprocessor;

detecting when the operating voltage drops below a brownout reference voltage with a programmable brownout detector, the programmable brownout detector being coupled to the programmable power supply;

providing a brownout signal output from the programmable brownout detector;

setting the operating voltage with a control unit, the control unit being coupled to the programmable power supply; and setting the brownout reference voltage with the control unit, the control unit being coupled to the programmable brownout detector.

2. The method according to claim 1, wherein the step of setting the brownout reference voltage includes the step of not exceeding a fixed fraction of the operating voltage.

3. The method according to claim 1, further comprising the step of disabling operation of the programmable brownout detector with the control unit.

4. The method according to claim 1, wherein:

the step of detecting when the operating voltage drops below the brownout reference voltage further comprises the step of setting the brownout reference voltage with a programmable brownout reference voltage source; and the step of providing the brownout signal output further comprises the step of providing the brownout signal output from a comparator coupled to the programmable brownout reference voltage source.

5. The method according to claim 1, wherein the step of providing a programmable power supply comprises the steps of:

setting a regulator reference voltage as a programmable regulator reference voltage source; and buffering the regulator reference voltage with a regulator coupled to the programmable regulator reference voltage source.

6. The method according to claim 2, wherein the step of providing a programmable power supply comprises the steps of:

producing a plurality of regulator reference voltages with a voltage divider network;

providing the operating voltage from a regulator coupled to the voltage divider network; and selecting discrete values of the plurality of regulator reference voltages with the control unit, the control unit having at least one output coupled to the voltage divider network.

7. The method according to claim 1, further comprising the steps of:

producing a plurality of brownout reference voltages with a voltage divider network; and selecting discrete values of the plurality of brownout reference voltages with the control unit, the control unit having at least one output coupled to the voltage divider network.

8. The method according to claim 7, further comprising the steps of:

producing a plurality of regulator reference voltages with a second voltage divider network;

providing the operating voltage from a regulator coupled to the second voltage divider network; and selecting discrete values of the plurality of regulator reference voltages with the control unit, the control unit having at least one second output coupled to the second voltage divider network.

9. The method according to claim 1, further comprising the step of changing the brownout reference voltage based on the setting of the operating voltage.

10. The method according to claim 9, further comprising the step of settings the brownout reference voltage so as not to exceed a fixed fraction of the operating voltage.

11. The method according to claim 9, further comprising the step of disabling operation of the programmable brownout detector with the control unit.

12. The method according to claim 9, wherein the step of providing a programmable power supply comprises the steps of:
setting a regulator reference voltage of the programmable regulator reference voltage source with a programmable regulator reference voltage source; and
buffering the regulator reference voltage with a regulator coupled to the programmable regulator reference voltage source.

13. The method according to claim 9, wherein the step of providing a programmable power supply comprises the steps of:
producing a plurality of regulator reference voltages with a voltage divider network;
providing the operating voltage from a regulator coupled to the voltage divider network; and
selecting discrete values of the plurality of regulator reference voltages with the control unit, the control unit having at least one output coupled to the voltage divider network.

14. The method according to claim 9, further comprising the steps of:
producing a plurality of brownout reference voltages with a voltage divider network; and
selecting discrete values of the plurality of brownout reference voltages with the control unit, the control unit having at least one output coupled to the voltage divider network.

15. The method according to claim 14, further comprising the steps of:
producing a plurality of regulator reference voltages with a second voltage divider network;
providing the operating voltage from a regulator coupled to the second voltage divider network; and
selecting discrete values of the plurality of regulator reference voltages with the control unit, the control unit having at least one second output coupled to the second voltage divider network.

16. A method for controlling a microprocessor power supply, said method comprising the steps of:
supplying an operating voltage to a microprocessor from a programmable power supply;
controlling the operating voltage with a control unit coupled to the programmable power supply, wherein the operating voltage is reduced when the microprocessor enters a sleep mode; and
providing a brownout signal output with a programmable brownout detector, the programmable brownout detector being coupled to the control unit and to the programmable power supply.

17. The method of claim 16, further comprising the steps of:
setting a regulator reference voltage with a programmable regulator reference voltage source; and
buffering the regulator reference voltage with a regulator coupled to the programmable regulator reference voltage source.

18. The method of claim 16, wherein the step of providing an operating voltage comprises the steps of:
producing a plurality of regulator reference voltages with a voltage divider network;
providing the operating voltage from a regulator coupled to the voltage divider network; and
selecting discrete values of the plurality of regulator reference voltages with the control unit, the control unit having at least one output coupled to the voltage divider network.

19. The method of claim 16 wherein the step of providing a brownout signal output with a programmable brownout detector comprises the steps of:
setting the brownout reference voltage with a programmable brownout reference voltage source, the programmable brownout reference voltage source being coupled to the control unit; and
providing a brownout signal output with a comparator, the comparator being coupled to the programmable brownout reference voltage source.

* * * * *